United States Patent

Yu

[11] Patent Number: 6,032,794
[45] Date of Patent: *Mar. 7, 2000

[54] CONTAINER FOR CASSETTE OR THE LIKE

[76] Inventor: Jack Yu, No. 109-1, Avenue 6, Lane 164, Tzong Sa Road, Da Du Hsiang, Taichung Hsien, Taiwan

[*] Notice: This patent is subject to a terminal disclaimer.

[21] Appl. No.: 09/225,410

[22] Filed: Jan. 5, 1999

[51] Int. Cl.[7] .................................................. B65D 85/57
[52] U.S. Cl. ........................ 206/308.1; 206/310; 206/493
[58] Field of Search ................................ 206/308.1, 309, 206/310, 493, 511, 512; 312/9.47, 9.48

[56] References Cited

U.S. PATENT DOCUMENTS

| | | |
|---|---|---|
| 4,747,484 | 5/1988 | Ackeret ................................. 206/308.1 |
| 5,366,073 | 11/1994 | Turrentine et al. ................... 206/308.1 |
| 5,590,769 | 1/1997 | Lin ........................................ 206/308.1 |
| 5,706,939 | 1/1998 | Yu ......................................... 206/308.1 |
| 5,706,943 | 1/1998 | Yu ......................................... 206/308.1 |
| 5,819,930 | 10/1998 | Yu ......................................... 206/308.1 |

*Primary Examiner*—Paul T. Sewell
*Assistant Examiner*—Nhan T. Lam

[57] ABSTRACT

A container includes a cover secured on a base for slidably receiving an insert and a spring for biasing the insert outward of the base. A housing is secured to the base and a chuck is slidably received in the housing and has a pair of pawls. The pawls have a space for receiving a stop of the insert when the pawls are biased outward of the housing, and are moved toward each other to secure the stop in place when the chuck is moved inward of the housing by the stop of the insert, such that the insert may be easily opened when a number of containers are superposed with each other.

8 Claims, 4 Drawing Sheets

CONTAINER FOR CASSETTE OR THE LIKE

BACKGROUND OF THE INVENTION

1. Field of the Invention

The present invent ion relates to a container, and more particularly to a container for storing tape cassettes or the like.

2. Description of the Prior Art

The closest prior art of which the applicant is aware is his prior U.S. Pat. No. 5,819,930 to Yu and comprise a disc storing base that may be released by actuating a latch device by the users themselves. However, the latch device includes a rather small size such that it is inconvenient to actuate such a latch device by the users.

The present invention has arisen to mitigate and/or obviate the afore-described disadvantages of the conventional disc containers.

SUMMARY OF THE INVENTION

The primary objective of the present invention is to provide an improved container that may be easily opened and closed without actuating or switching the latch device.

In accordance with one aspect of the invention, there is provided a container for tape cassette comprising a base including a front portion and including two sides and including a rear portion having a rear wall, an insert slidably engaged in the base, the insert including a stop extended rearward therefrom, a cover secured on the base for retaining the insert in the base, means for biasing the insert outward of the base, a latch secured to the rear portion of the base. The latch includes means for engaging with the stop of the insert to retain the insert in place relative to the base when the insert is moved inward of the base and to release the insert when the insert is moved inward of the base again.

The base includes a retainer and a pin formed in the rear portion of the base, the biasing means includes a spring having an end portion engaged with the retainer and having a ring engaged with the pin, for stably securing the spring to the base. The spring includes an outer segment engaged with the insert and includes a middle segment having three bent portions for increasing a resilience of the spring. The spring includes a ring formed between the middle segment and the outer segment of the spring.

The latch includes a housing secured to the base, and a chuck slidably received in the housing and having a pair of pawls, and means for biasing the pawls of the chuck outward of the housing, the pawls of the chuck have a space for receiving the stop of the insert when the pawls are biased outward of the housing, and the pawls of the chuck are moved toward each other to secure the stop in place when the chuck is moved inward of the housing by the stop of the insert.

The housing includes a channel formed therein, the chuck includes a spring-biased catch engaged with the channel, the channel includes a first end for engaging with the catch when the pawls are biased outward of the housing and includes a recess formed therein for engaging with the catch when the pawls of the chuck are moved outward of the housing. The housing includes a cusp extended inward of the channel and located between the recess and the first end of the channel. The catch includes a protrusion for slidably engaging with the channel of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
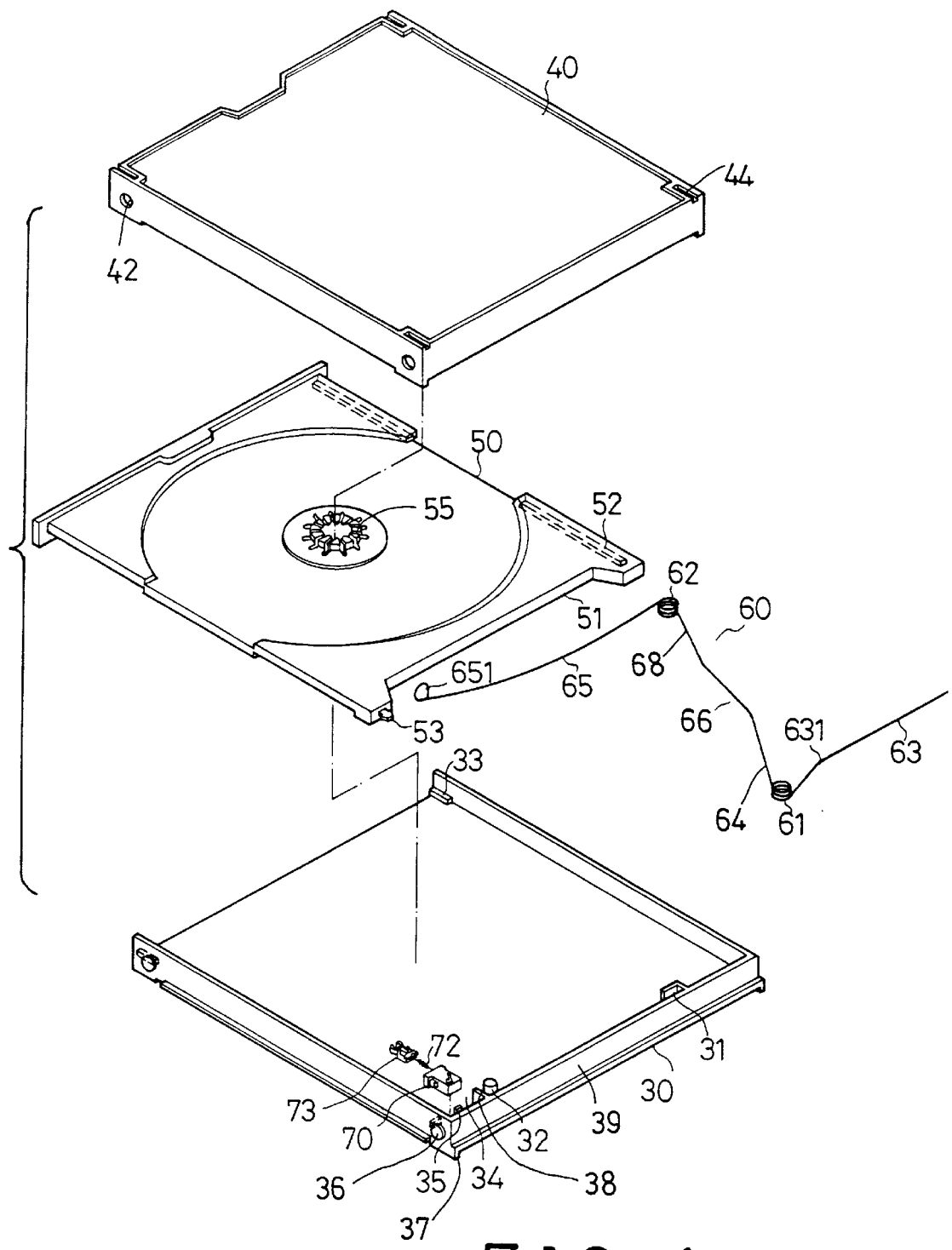
FIG. 1 is an exploded view of a container in accordance with the present invention.

Referring to the drawings, and initially to FIGS. 1 to 4, a container in accordance with the present invention comprises a base 30 including four projections 36 provided on the four corner areas and including a rear portion having a wall 39 extended upward. A cover 40 includes four holes 42 for receiving the projections 36 and for allowing the cover 40 to be easily secured to the base 30. The base 30 includes a retainer 31 and a pin 32 and a bar 38 formed in the rear portion close to the wall 39 for engaging with and for securing the rear segment 63 of a spring 60 in place. The rear segment 63 of the spring 60 includes a bent portion 631 for increasing the resilience of the rear segment 63 of the spring 60 and for allowing the rear segment 63 to apply a spring force against the wall 39 and for allowing the rear segment 63 of the spring 60 to be resiliently secured in place. The cover 40 includes four depressions 44 formed in top of the four corners. The base 30 includes four bulges 37 extended downward from the four corners for engaging with the depressions 44 of the cover 40 of the other containers and for allowing two or more containers to be stably stacked with each other. The base 30 includes two front corners each having a rib 33 provided thereon.

Figure 2:
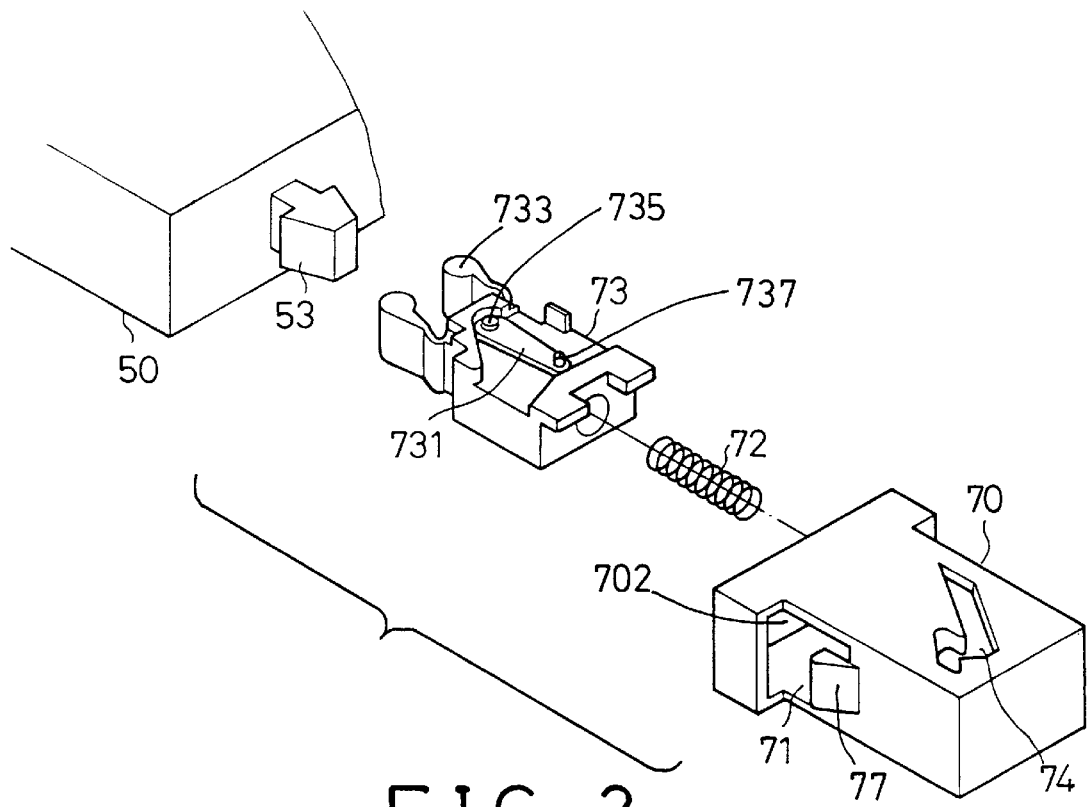
FIG. 2 is a partial exploded view of a latch device of the container.

The base 30 includes an opening 34 formed between two ears 35 which are disposed in one of the two rear corners of the base 30, for receiving a housing 70 of a latch device. The housing 70 includes an open front 702 for slidably receiving a chuck 73, and includes two shoulders 71 for receiving the ears 35, and includes two spring-biased hooks 77 engaged with the ears 35 for easily and quickly securing the housing 70 to the base 30. The housing 70 includes a channel 74 having a recess 744 and having one end 746, and includes a cusp 742 extended inward of the middle portion of the channel 74 and includes a tapered surface 748 formed therein. A spring 72 is engaged between the housing 70 and the chuck 73 for biasing the pawls 733 of the chuck 73 outward of the housing 70. The chuck 73 includes a catch 731 having one end resiliently secured to the chuck 73 at a resilient pin 735 that is formed of such as rubber materials. Or, a spring may engaged on the pin 735 and engaged with the catch 731 for biasing the catch 731 toward the center position as shown in FIG. 2. The catch 731 has an extension 737 extended upward therefrom for slidably engaging with the channel 74 of the housing 70 (FIG. 3).

Figure 3:
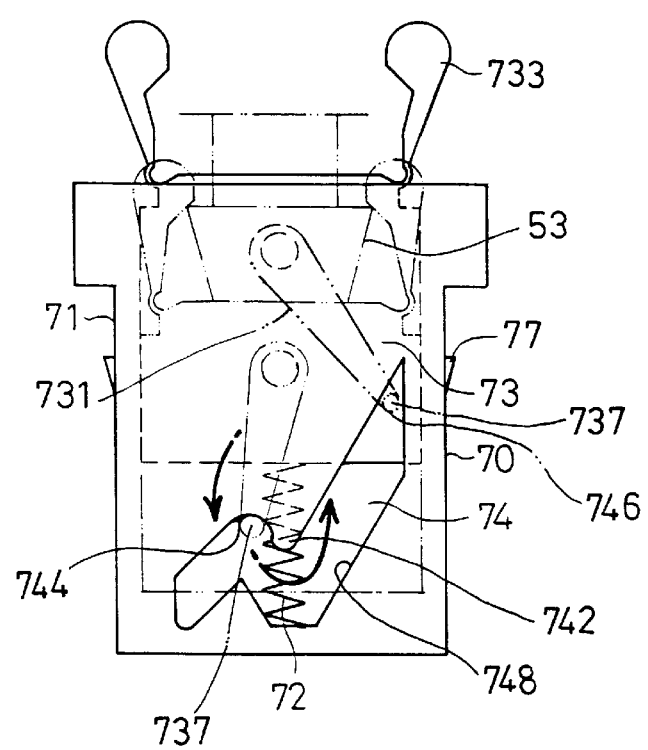
FIG. 3 is a top schematic view illustrating the operation of the latch device of the container.

As best shown in FIG. 3, the pawls 733 are resiliently coupled to or extended from the chuck 73 at a live hinge such that the pawls 733 are resiliently coupled to the chuck 73 and arranged such that the pawls 733 will slightly separate from each other when the pawls 733 are biased outward of the housing 70 by the spring 72, as shown in solid lines in FIG. 3. The pawls 733 will be caused to engage with the housing 70 and will be moved toward each other when the chuck 73 is moved inward of the housing 70, as shown in dotted lines in FIG. 3.

An insert 50 is slidably engaged between the base 30 and the cover 40 and includes a flexible disc retaining hub 55 provided in the center portion. The cover 40 may stably retain the insert 50 in the base 30. The insert 50 includes a seat 51 for receiving the other end or the bent end 651 of the spring 60 which is engaged between the insert 50 and the wall 39 for biasing the insert 50 outward of the base 30. The insert 50 includes a shoulder 52 formed in one or both of the side portions for slidably engaging with the ribs 33 of the base 30 and for guiding the sliding movement of the insert 50 relative to the base 30. The ribs 33 of the base 30 maxi also prevent the insert 50 from being disengaged from the base 30. The insert 50 includes a stop 53 for engaging with the pawls 733 of the chuck 73 and for moving the chuck 73 into the housing 70. When the pawls 733 are biased outward of the housing 70, the open size between the pawls 733 is good enough for receiving the stop 53. The engagement of the protrusion 737 of the catch 731 with the one end 746 of the channel 74 may limit the outward movement of the pawls 73 relative to the housing 70. When the chuck 73 is moved inward of the housing 70 by the stop 53 of the insert 50, the protrusion 737 of the catch 731 has a tendency to move toward the recess 744 of the channel 74, when the insert 50 is released, by the resilience of the pin 735 or the resilient force applied to the catch 731. At this moment, the stop 53 will be retained in place by the pawls 733 such that the insert 50 may be locked in the base 30. When the insert 50 is depressed inward of the base 30 to move the chuck 73 inward of the housing 70 with the stop 53, the protrusion 737 of the catch 731 has a tendency to move toward the one end 746 of the channel 74 by the resilience of the pin 735 or the resilient force applied to the catch 731 when the insert 50 is released again. The insert 50 should be depressed and released quickly for allowing the protrusion 737 of the catch 731 to be moved beyond the cusp 742 without moving in a backward direction.

Figure 4:
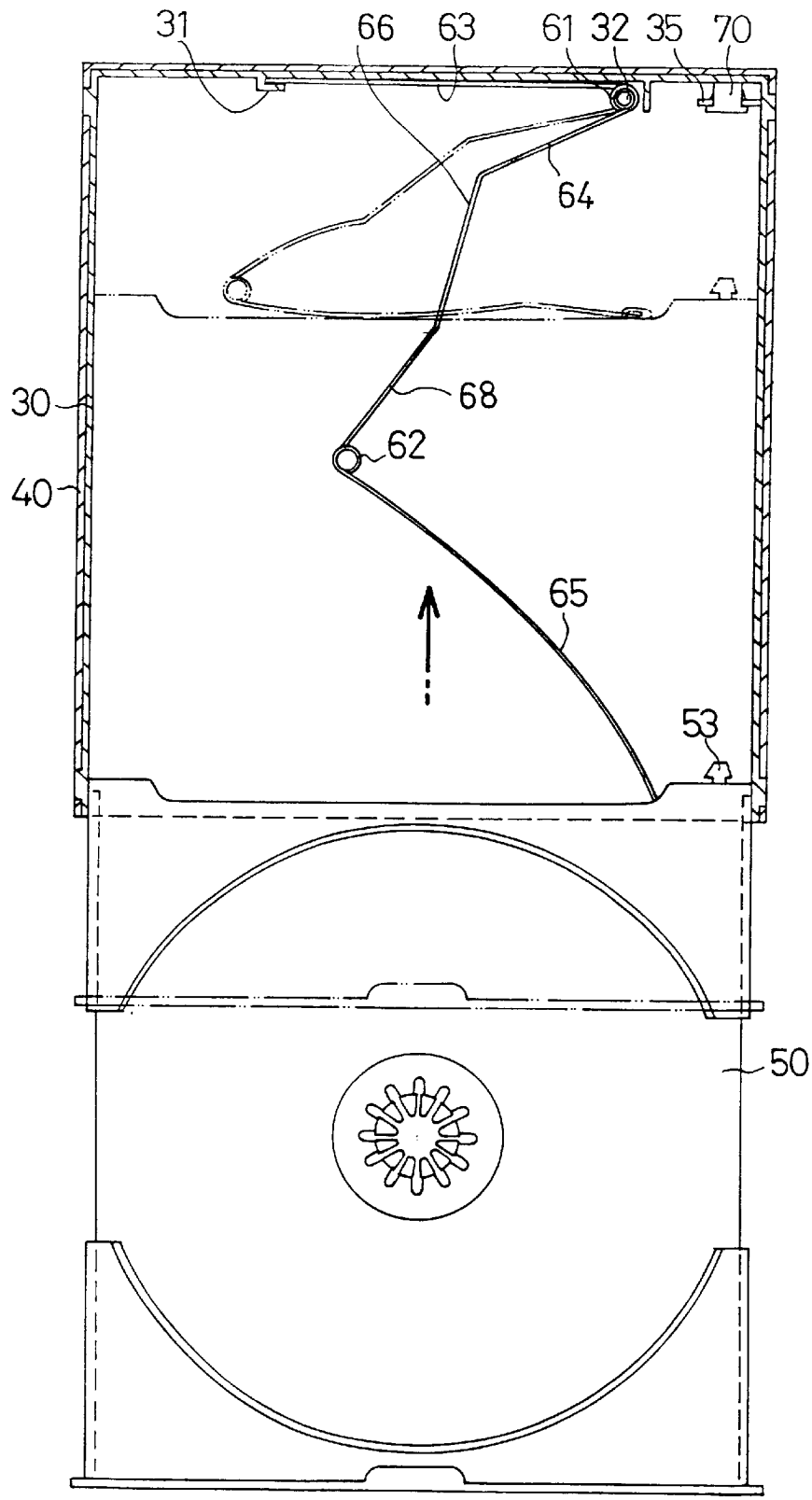
FIGS. 4 and 5 are cross sectional views illustrating the operation of the container.
Figure 5:
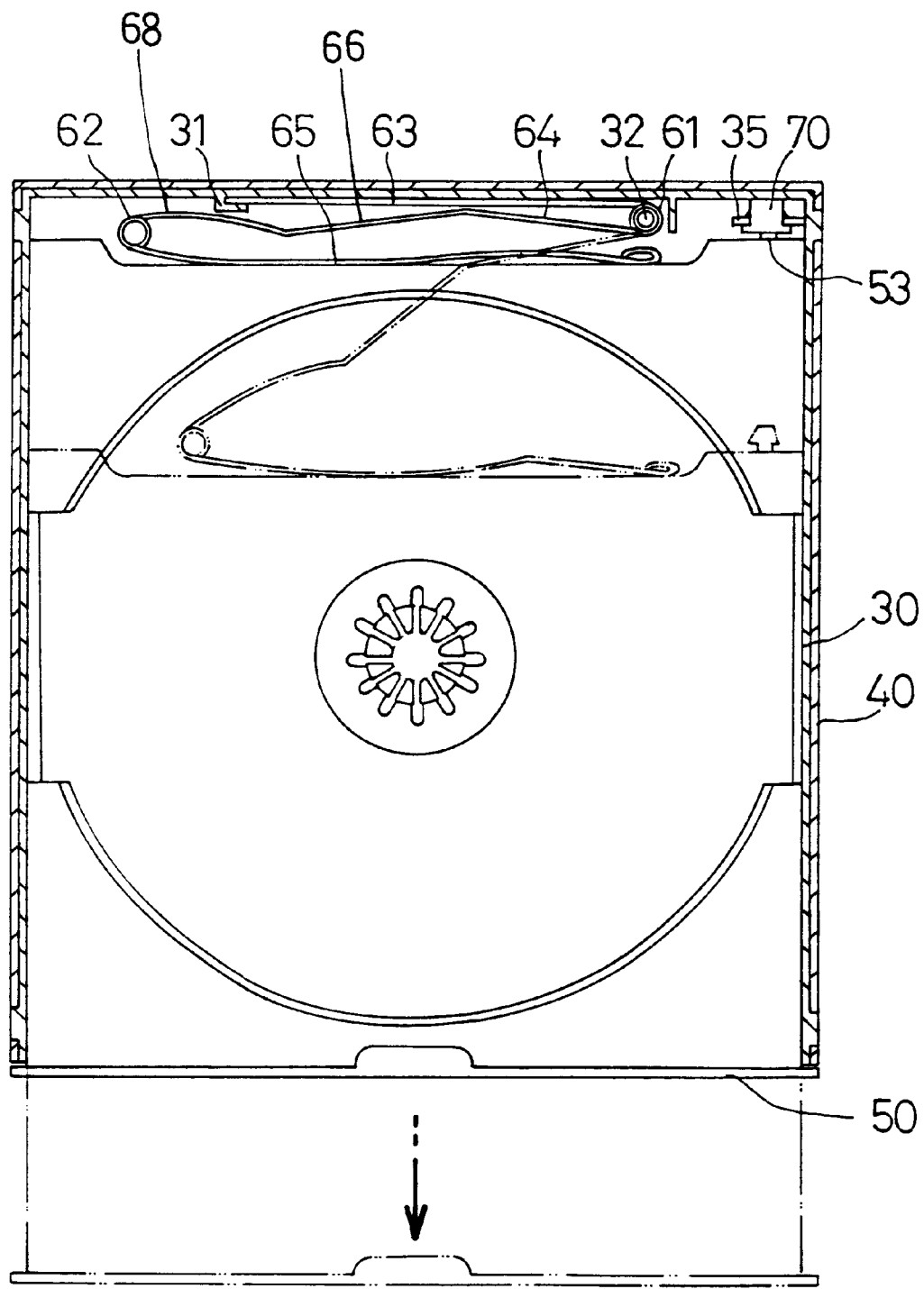

The rear segment 63 of the spring 60 includes an end portion engaged with the retainer 31 and includes a ring 61 engaged with the pin 32 and the bar 38 and for allowing the rear segment 63 of the spring 60 to be stably retained in place to the base 30. The spring 60 includes a middle segment having three bent portions 64, 66, 68 for increasing the resilience of the spring 60. The spring 60 includes an outer segment 65 coupled to the middle segment at a ring 62 and having the bent end 651 for engaging with the seat 51 of the insert 50, and is Z-shaped for allowing the spring 60 to includes an excellent resilience. As shown in FIGS. 4, 5, the outer segment 65 of the spring 60 may first be bent before the three portions 64, 66, 68 of the middle segment of the spring 60 may be bent. The spring 60 may apply a gentle resilient force against the insert 50 for smoothly moving the insert 50 outward of the base 30.

Accordingly, the container in accordance with the present invention includes an insert which may be easily opened and operated without actuating or switching the latch device by the user when a number of containers are superposed with each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A container comprising:

a base including a front portion and including two sides and including a rear portion having a rear wall, an insert slidably engaged in said base, said insert including a stop extended rearward therefrom, a cover secured on said base for retaining said insert in said base, means for biasing said insert outward of said base, a latch secured to said rear portion of said base, said latch including means for engaging with said stop of said insert to retain said insert in place relative to said base when said insert is moved inward of said base and to release said insert when said insert is moved inward of said base again.

2. The container according to claim 1, wherein said base includes a retainer (31) and a pin (32) formed in said rear portion of said base, said biasing means includes a spring having an end portion engaged with said retainer and having a ring engaged with said pin, for stably securing said spring to said base.

3. The container according to claim 2, wherein said spring includes an outer segment engaged with said insert and includes a middle segment having three bent portions for increasing a resilience of said spring.

4. The container according to claim 3, wherein said spring includes a ring formed between said middle segment and said outer segment of said spring.

5. The container according to claim 1, wherein said latch includes a housing secured to said base, and a chuck slidable received in said housing and having a pair of pawls, and means for biasing said pawls of said chuck outward of said housing, said pawls of said chuck has a space for receiving said stop of said insert when said pawls are biased outward of said housing, and said pawls of said chuck are moved toward each other to secure said stop in place when said chuck is moved inward of said housing by said stop of said insert.

6. The container according to claim 5, wherein said housing includes a channel formed therein, said chuck includes a spring-biased catch engaged with said channel, said channel includes a first end for engaging with said catch when said pawls are biased outward of said housing and includes a recess formed therein for engaging with said catch when said pawls of said chuck are moved outward of said housing.

7. The container according to claim 6, wherein said housing includes a cusp extended inward of said channel and located between said recess and said first end of said channel.

8. The container according to claim 6, wherein said catch includes a protrusion for slidably engaging with said channel of said housing.

\* \* \* \* \*